(12) United States Patent
Öhrle et al.

(10) Patent No.: US 6,923,108 B2
(45) Date of Patent: Aug. 2, 2005

(54) COMPOSITE DIAPHRAGM FOR DIAPHRAGM PUMPS

(75) Inventors: Joachim Öhrle, Herrenberg (DE); Leon Radom, Ellhofen (DE)

(73) Assignee: ULMAN Dichtungstechnik GmbH, Sindelfingen (DE)

( * ) Notice: Subject to any disclaimer, the term of this patent is extended or adjusted under 35 U.S.C. 154(b) by 160 days.

(21) Appl. No.: 10/430,074

(22) Filed: May 6, 2003

(65) Prior Publication Data

US 2003/0230192 A1 Dec. 18, 2003

(30) Foreign Application Priority Data

Jun. 18, 2002 (DE) ......................................... 102 27 192

(51) Int. Cl.$^7$ ................................................ F16J 3/00
(52) U.S. Cl. .................... 92/103 R; 92/103 F
(58) Field of Search ..................... 92/96, 103 F, 103 R, 92/103 SD, 104

(56) References Cited

U.S. PATENT DOCUMENTS

| | | | | |
|---|---|---|---|---|
| 3,911,796 A | * | 10/1975 | Hull et al. ................. | 92/103 R |
| 4,270,441 A | * | 6/1981 | Tuck, Jr. .................. | 92/103 SD |
| 5,349,896 A | * | 9/1994 | Delaney et al. ........... | 92/103 F |
| 5,699,717 A | * | 12/1997 | Riedlinger ................ | 92/103 R |

* cited by examiner

*Primary Examiner*—Thomas E. Lazo
(74) *Attorney, Agent, or Firm*—Collard & Roe, P.C.

(57) ABSTRACT

A composite diaphragm for diaphragm pumps comprises an elastomer body and a polytetrafluoroethylene (PTFE) coating on its back side. The elastomer body has a shape of a circular dish that has an edge region with a clamping area, a bottom and a flexible section of the diaphragm that connects the edge of the dish with the bottom. The flexible section of the diaphragm comprises a multitude of naps forming elevations on the elastomer backside of the elastomer body. The PTFE coating is a plane ring surface with the area of the flexible section of the diaphragm.

13 Claims, 10 Drawing Sheets

COMPOSITE DIAPHRAGM FOR DIAPHRAGM PUMPS

BACKGROUND OF THE INVENTION

1. Field of the Invention

The invention relates to a composite diaphragm for diaphragm pumps that comprises an elastomer body and a coating of polytetrafluoroethylene (PTFE) on the product side. The elastomer body has the shape of a circular dish that has an edge with a clamping area, a bottom, and a flexible section of the diaphragm that connects the edge of the dish with the bottom.

The composite diaphragm is clamped in a diaphragm pump along the side of the edge, whereas the bottom of the composite diaphragm performs lifting movements. The flexible section of the diaphragm is turned inside out, with each lifting movement, whereby the roll-off movements of the flexible material are observed in a radial section. In the technical field, the flexible section of the diaphragm is therefore referred to also as a rolling loop.

2. The Prior Art

When using composite diaphragms where the flexible section of the diaphragm without a profile has a uniform wall thickness, white staining can occur in radial lines in the PTFE-coating that indicates the onset of material damage. As the damage to the PTFE-material progresses, the composite diaphragm loses its chemical resistance to aggressive conveyed media. The development of this damage limits the useful life of the diaphragm.

U.S. Pat. No. 5,349,896 discloses a design wherein the flexible section of the diaphragm is stiffened by radial ribs. The ribs extend from the transition area adjoining the bottom, up to the edge of the dish of the elastomer body. With a different number of radial stiffening ribs, it is possible to prevent the development of the damage described above. However, the roll-off property of the flexible section of the diaphragm deteriorates and the resistance to roll-off increases to a considerable extent.

When using this diaphragm with vacuum pumps, composite diaphragms are preferred that have a smooth surface on the product side and rest flatly against the surfaces of the pump when the latter is in operation. The invention provides a suitable composite diaphragm for diaphragm pumps that permits a long useful life without damage to the PTFE coating and uses good roll-off properties when the pump is in operation.

SUMMARY OF THE INVENTION

The invention relates to a diaphragm having flexible section that has a large number of naps forming elevations on the elastomer backside of the elastomer body. In this design, the PTFE coating is formed in the area of the flexible section of the diaphragm as a plane ring surface. The naps on the elastomer backside are preferably formed as cups with a circular or elliptic base area. The naps supply the flexible section of the diaphragm with punctual or periodic stiffening elements. The areas between the naps are flexible, so that the flexible section of the diaphragm can be turned inside out with little pressure. Thus, these naps prevent wear on the diaphragm because no folds caused by compression or lines caused by buckling can form in the PTFE coating due to these punctual stiffening elements. When in use, the composite diaphragm performs defined rolling movements, whereby the resistance to roll-off of the rolling loop is low.

Numerous possibilities are available for further variations of the composite diaphragm as defined by the invention. The naps are preferably arranged lined up in at least two concentric circles, preferably with an angular division of between 5° and 30°. The naps that are arranged in concentric circles may be arranged lined up in the radial direction in lines extending through the center of the circle. The invention also includes an embodiment in which the naps disposed in neighboring circles are disposed at offset angles in relation to each other so that in the radial direction, one nap is disposed in front of each gap between two naps lined up in the peripheral direction. Furthermore, in at least one embodiment, the naps arranged in the circle with the largest diameter and/or the smallest diameter are forming a chain without gaps in the peripheral direction.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIGS. 4a to 4h show further exemplified embodiments represented in each case by a view of the backside.

DETAILED DESCRIPTION OF THE PREFERRED EMBODIMENTS

Figure 1:
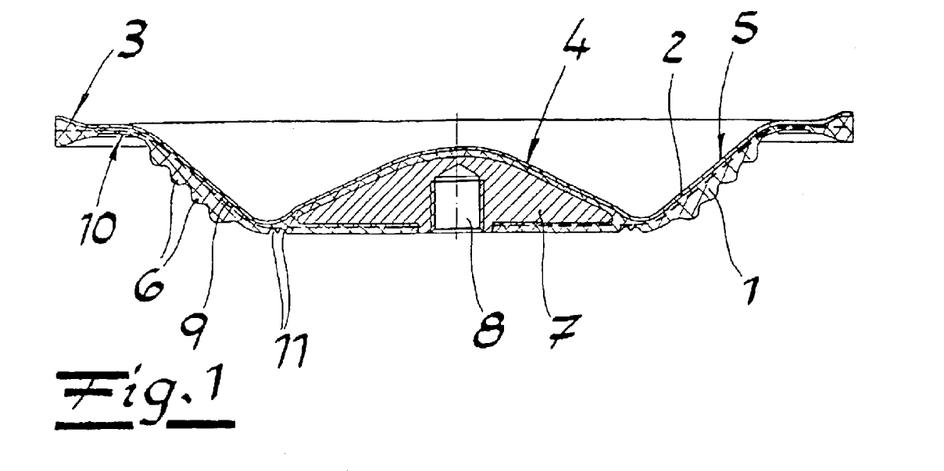
FIG. 1 is a section through one embodiment of a composite diaphragm as defined by the invention for diaphragm pumps.
Figure 2:
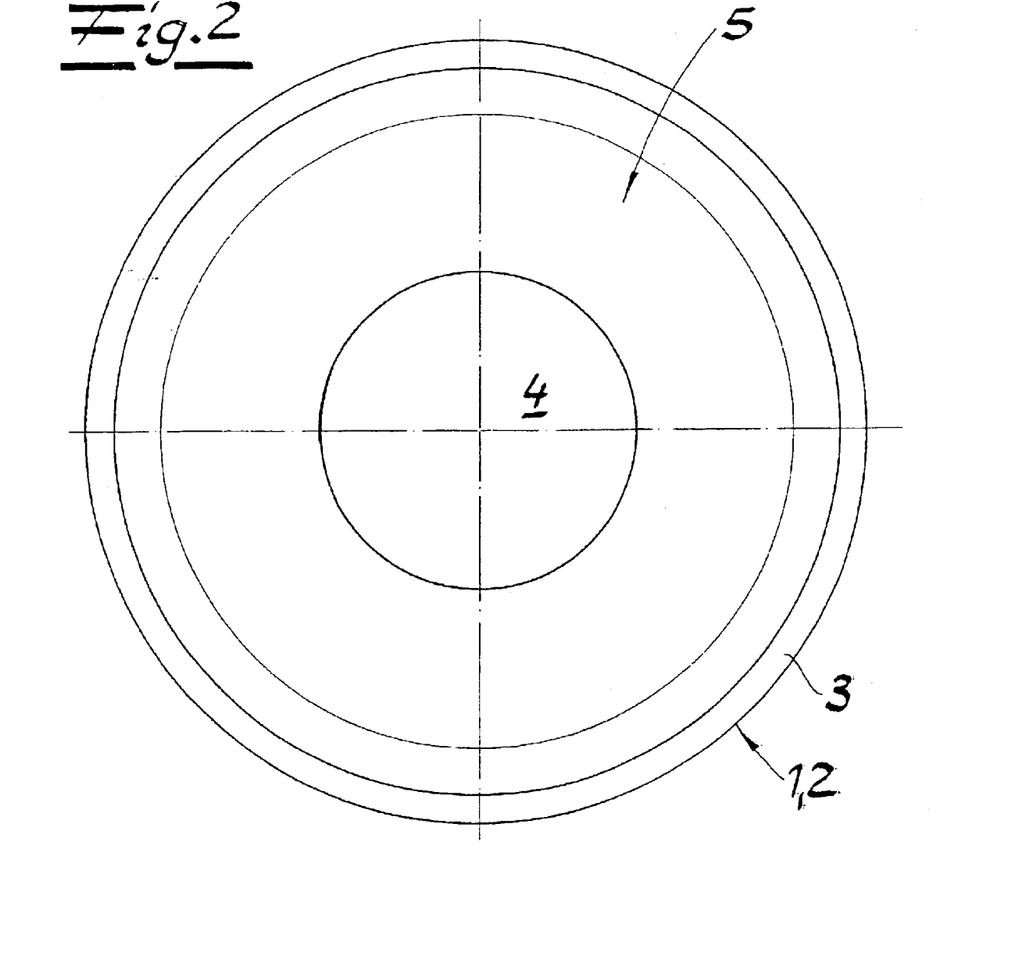
FIG. 2 is a top view of the product side of the composite diaphragm shown in FIG. 1.

Referring to the drawings, FIG. 1 shows an example of a composite diaphragm for diaphragm pumps. The composite diaphragm is composed on an elastomer body 1 and a coating 2 of polytetrafluoroethylene (PFTE) applied to the product side. The elastomer body 1 is in the form of a circular dish comprising an edge 3 of the dish with a clamping area, a bottom 4, and a flexible diaphragm section 5 connecting the edge of the dish with the bottom. A comparative view of the figures shows that flexible section 5 of the diaphragm has a multitude of naps 6, which form elevations on the elastomer backside of elastomer body 1. In addition, within the area of the flexible section of the diaphragm, the PTFE coating 2 is a plane ring surface.

Naps or protrusions can be formed as cups with a preferably circular base area and are arranged in concentric circles in the exemplified embodiments with an angular division a of between 5° and 30°.

Figure 3:
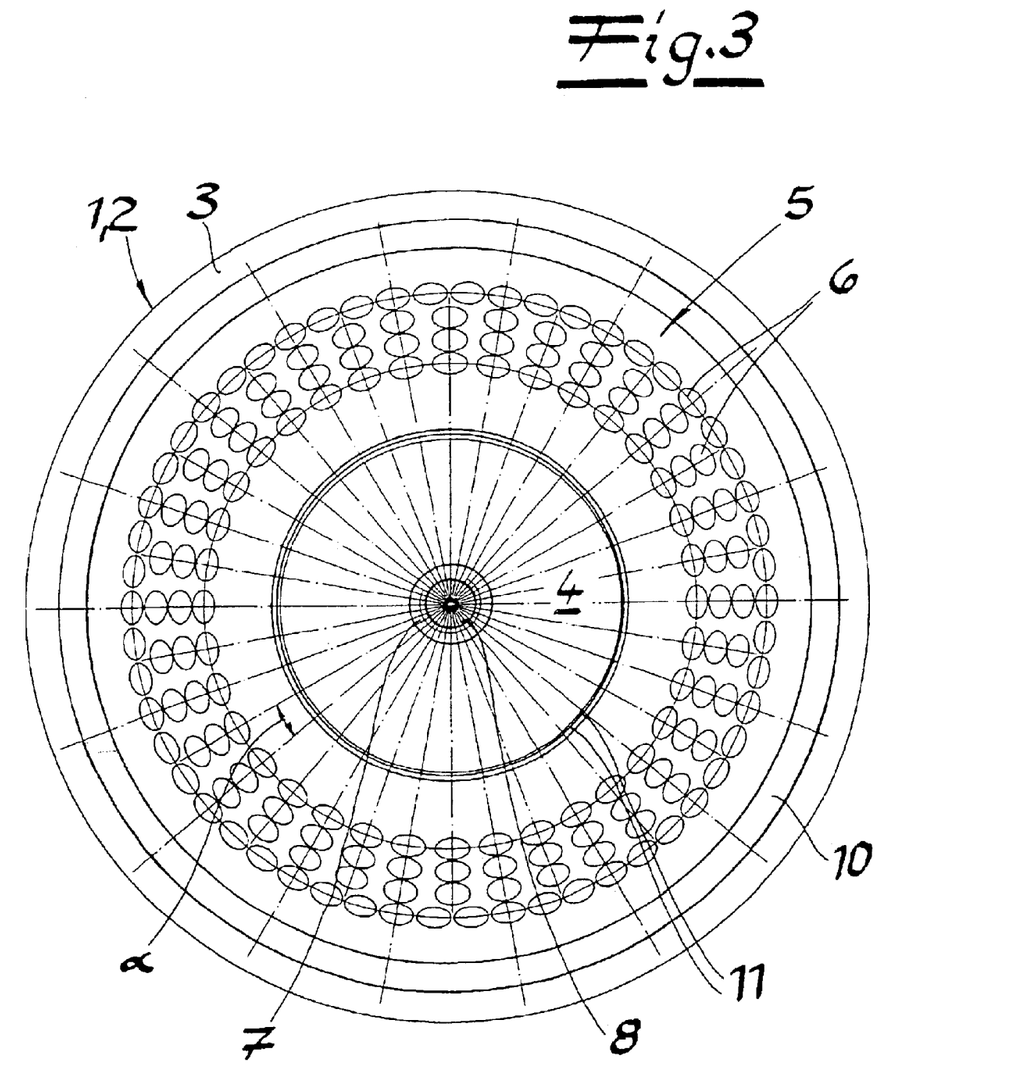
FIG. 3 is a view of the backside of the object shown in FIG. 1.
Figure 4A:
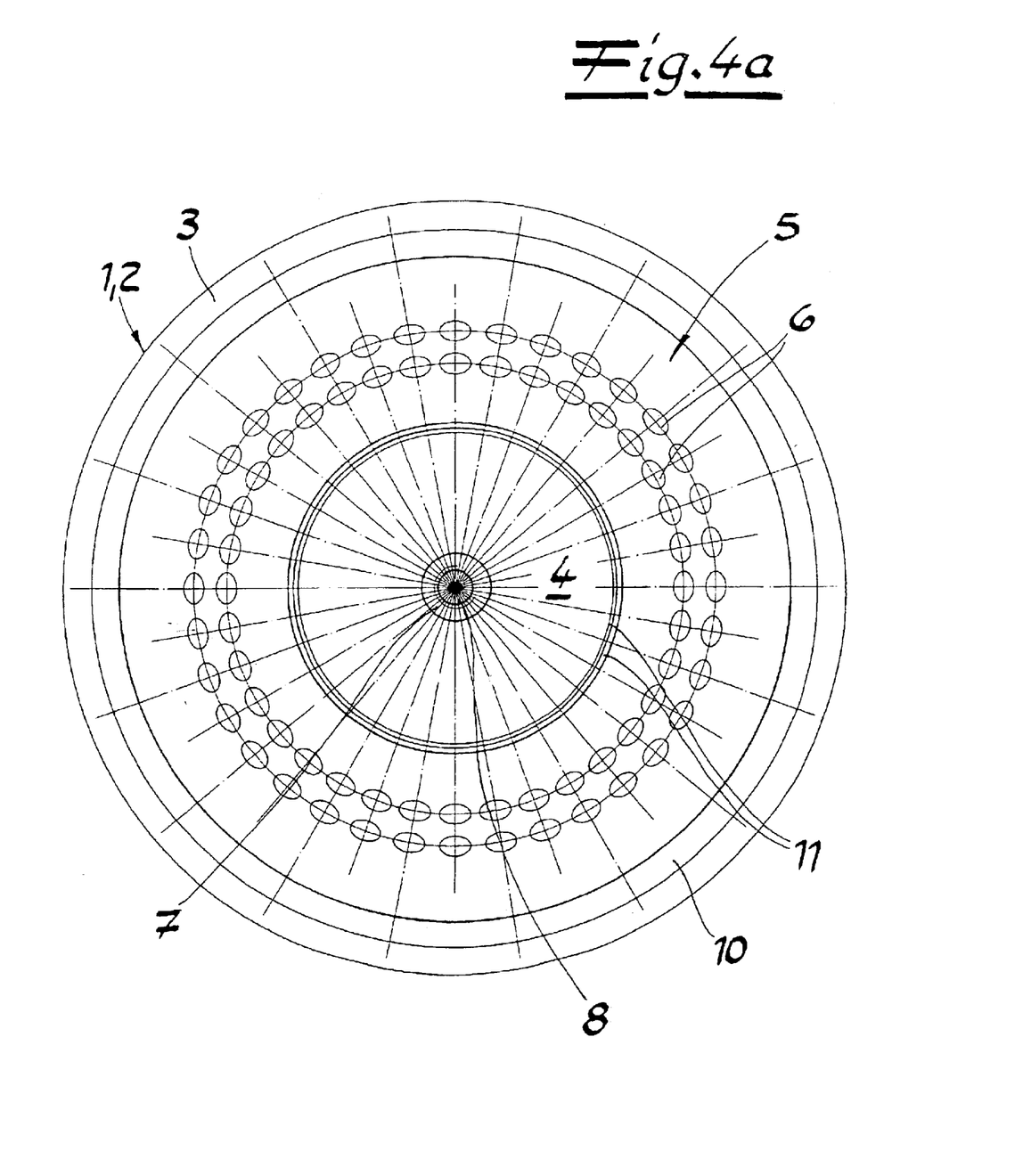
Figure 4B:
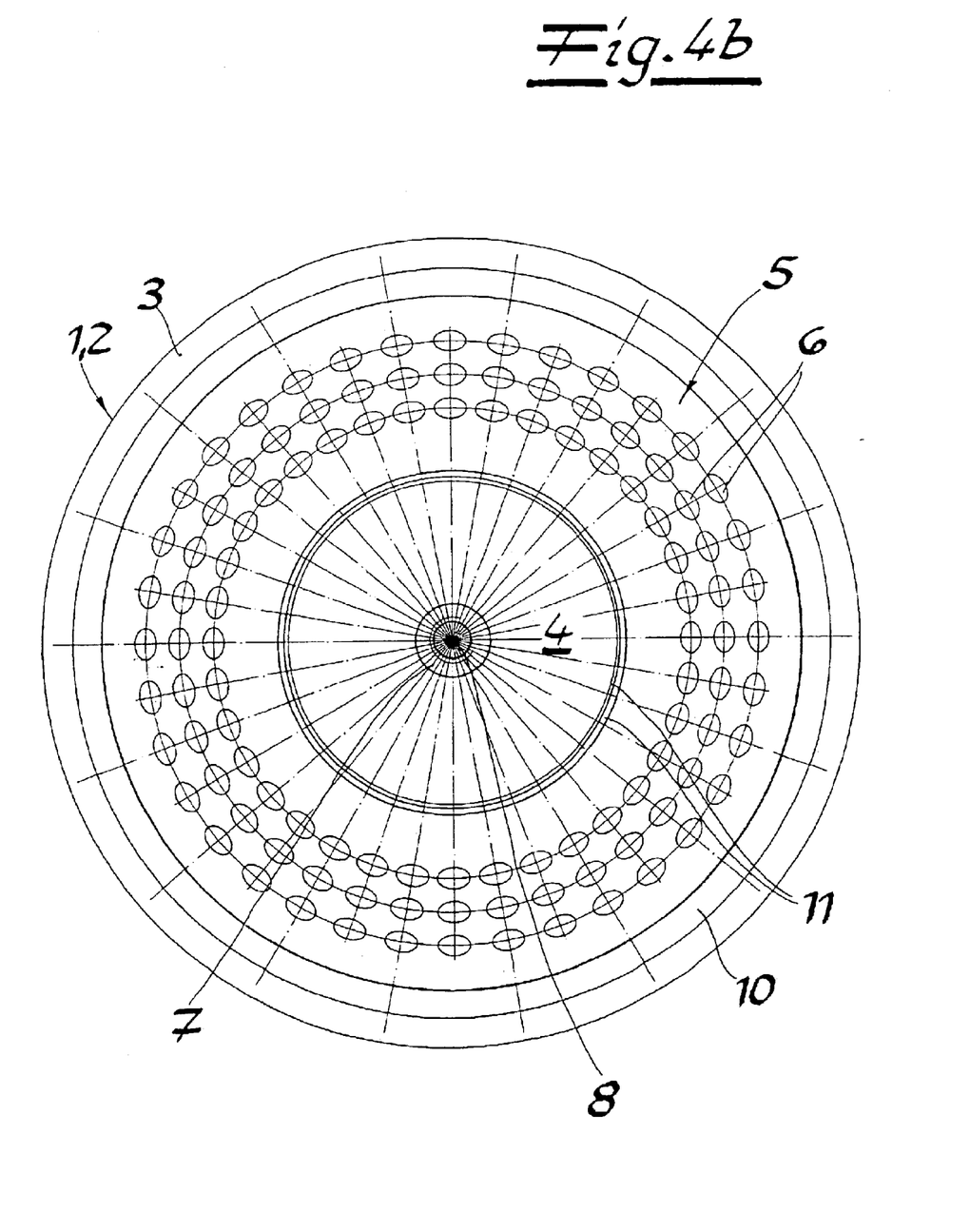
Figure 4C:
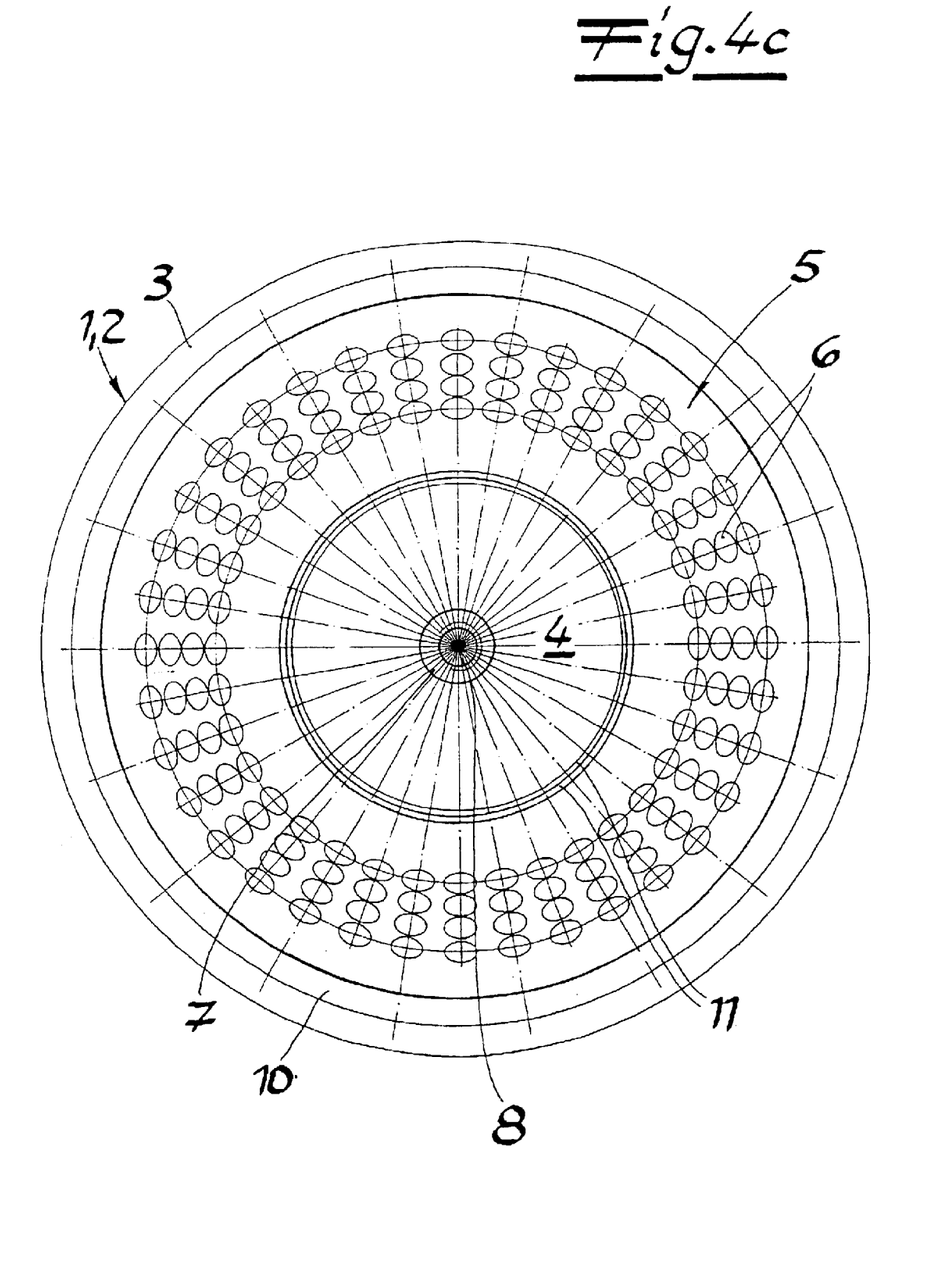
Figure 4D:
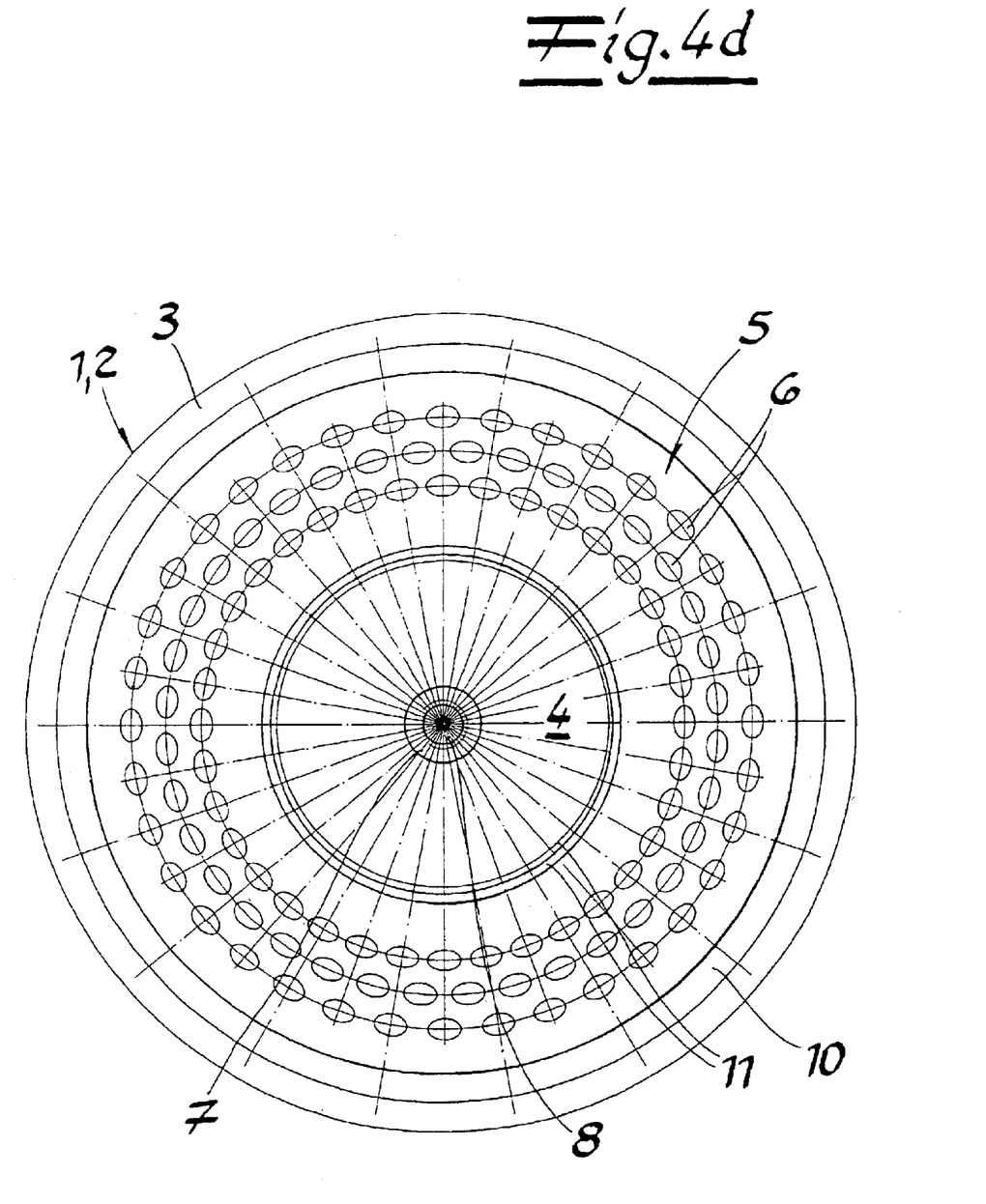
Figure 4E:
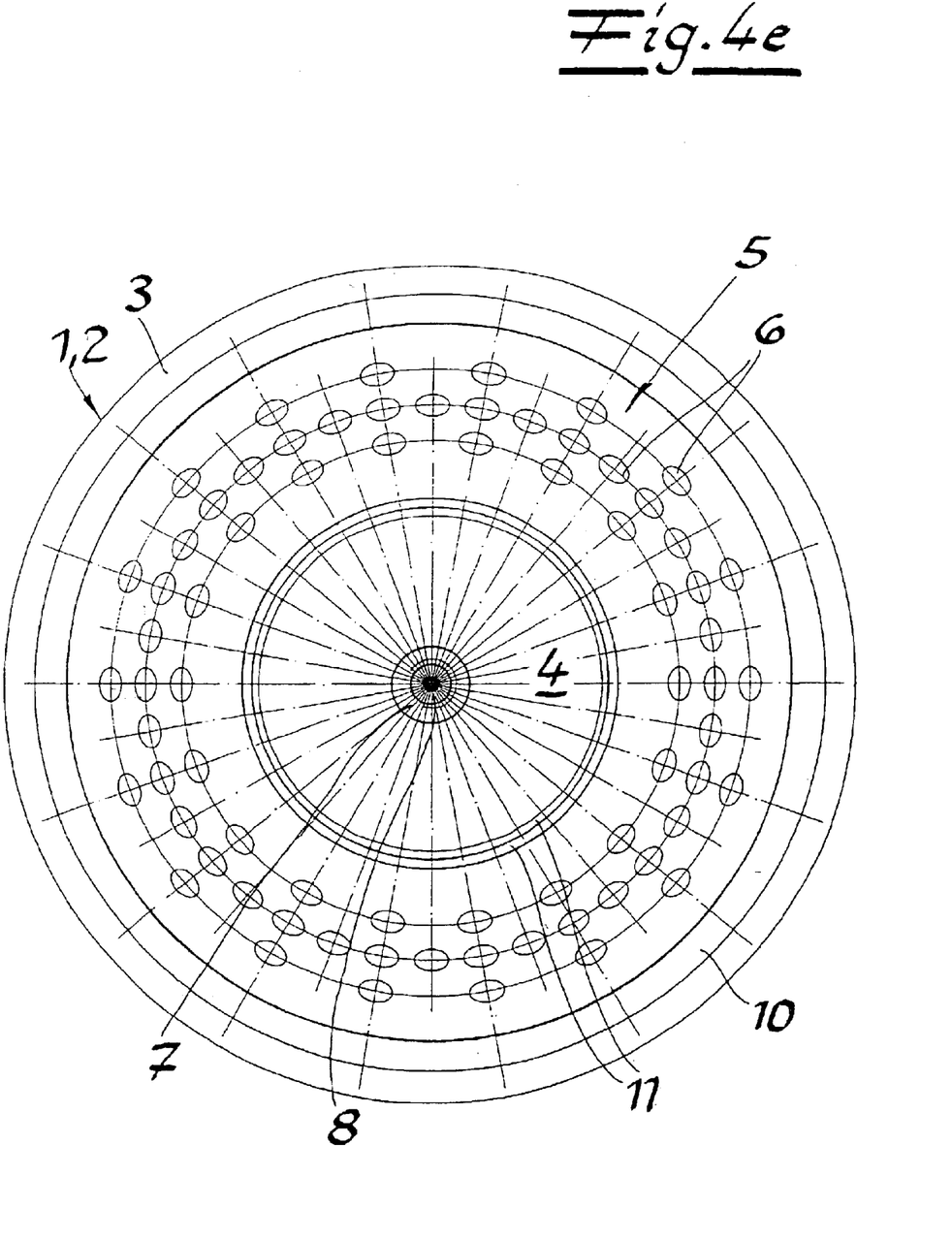
Figure 4F:
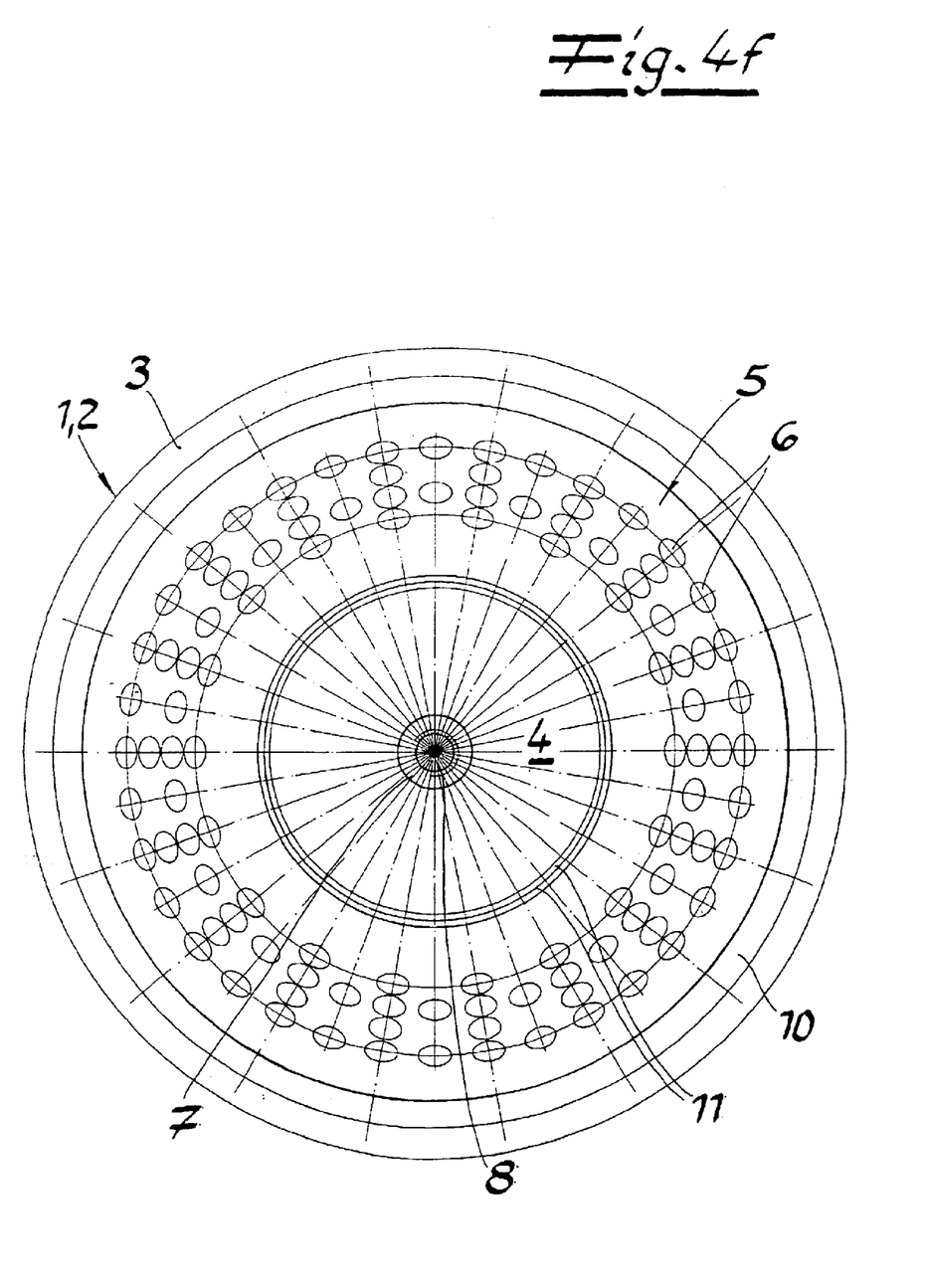
Figure 4G:
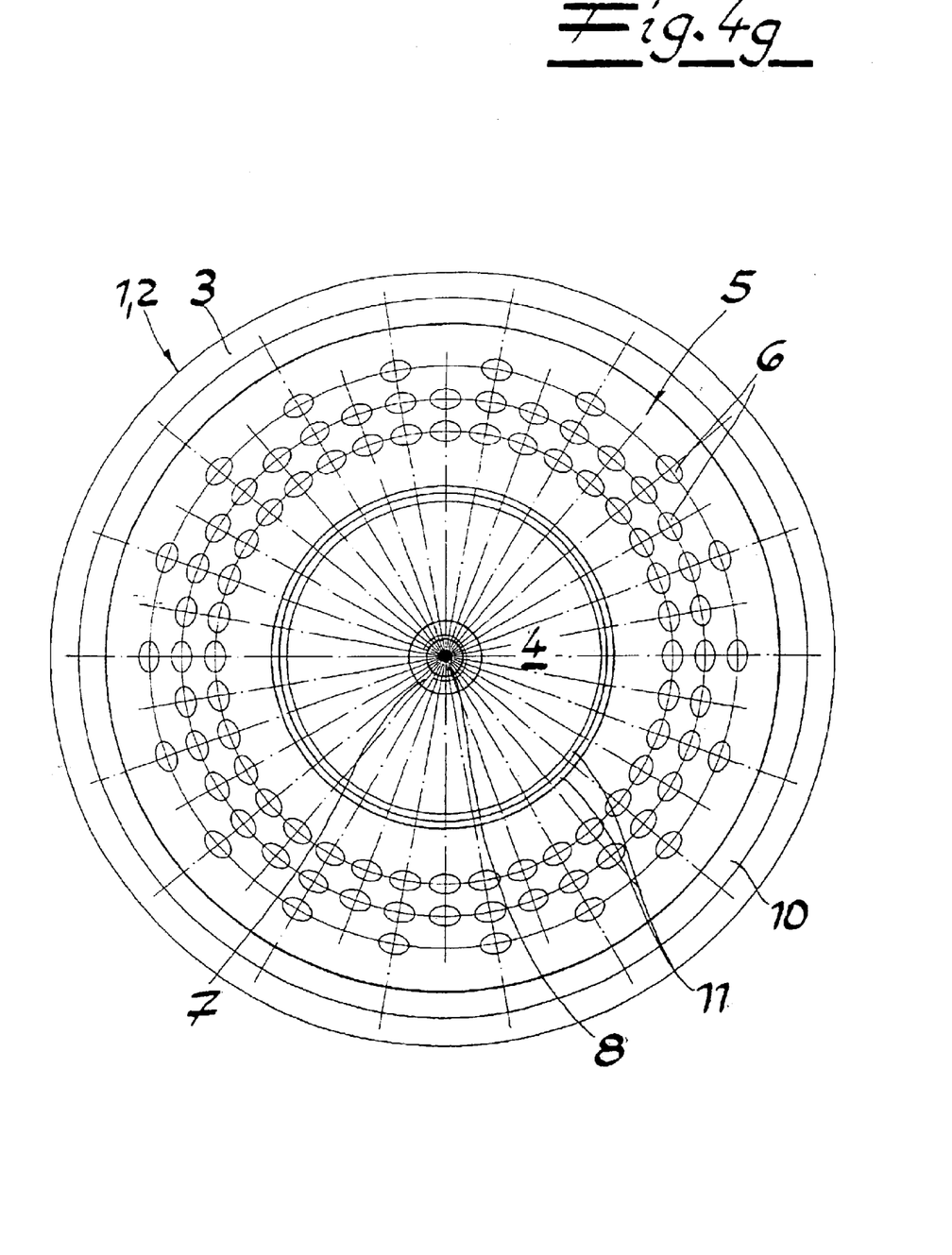
Figure 4H:
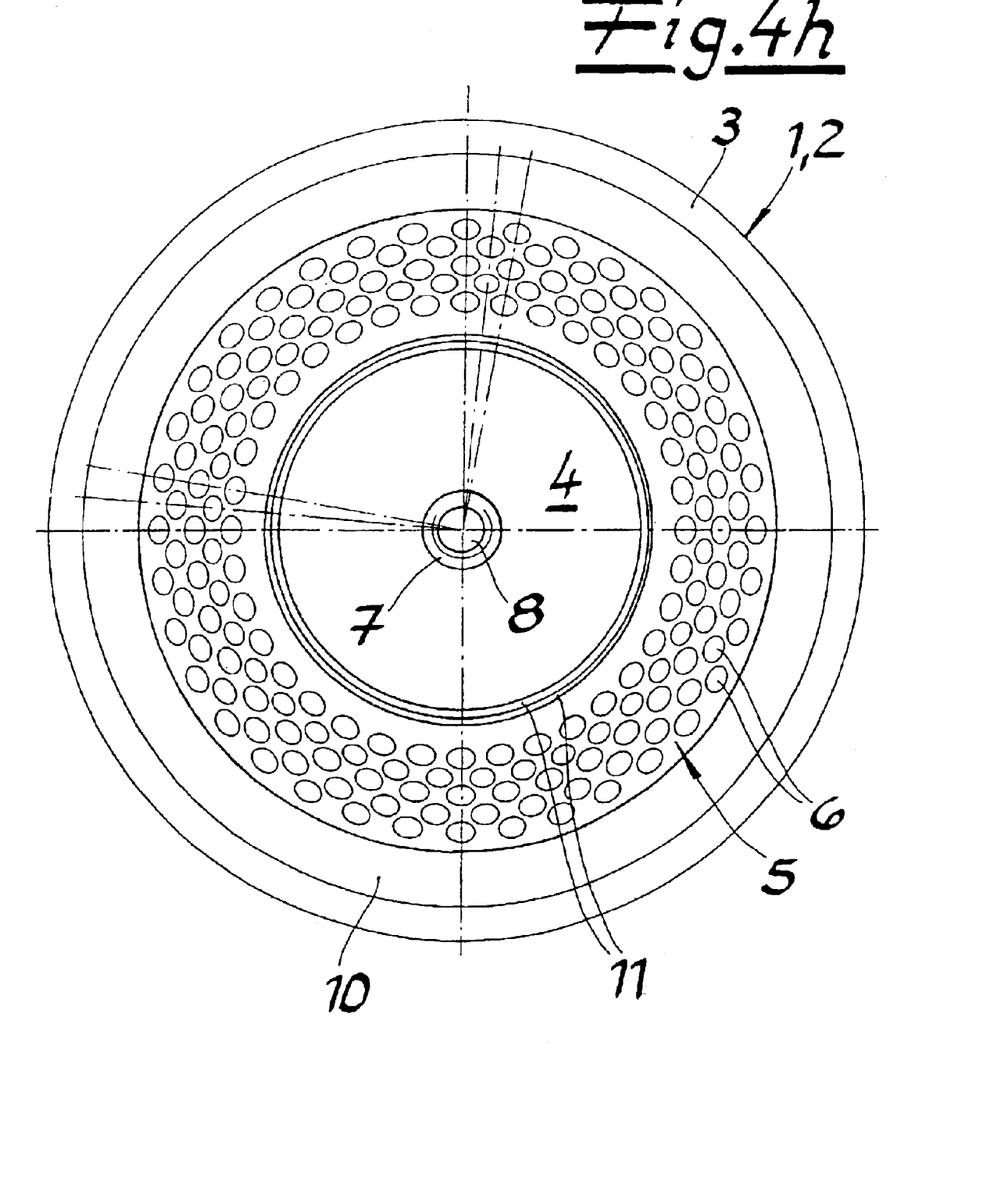

In the exemplified embodiment shown in FIG. 3, naps 6 are lined up in the radial direction with a small spacing between each other in lines extending through the center of the circle. Furthermore, FIG. 3 shows that naps 6 arranged on the circle with the largest diameter form a chain without gaps in the peripheral direction. Other arrangements of naps 6 are shown in FIGS. 4a to 4h.

FIG. 1 shows that bottom 4 of elastomer body 1 contains a core that is incorporated in the body by vulcanization, and comprises a device for connecting a piston rod. This device can be in the form of a reinforcing insert for receiving the piston rod or simply a gap formed on bottom Section 4. The design of this device can be in the form of a substantially cylindrical gap. In the exemplified embodiment, the product side of the bottom has a convex shape. However, other shapes are not excluded. The elastomer body 1 contains a textile reinforcement insert 9 and, on its elastomer backside in the transition area between the edge 3 of the dish and the flexible section 5 of the diaphragm, comprises a circular recess 10, as well as the ring-shaped grooves 11 located in the transition area between the flexible diaphragm section 5 and the bottom 4. The purpose of the recess 10 and the grooves 11 is to additionally enhance the roll-off property of the flexible diaphragm section 5.

The instruction as defined by the invention also covers composite diaphragms with bottoms not containing a metal core incorporated by vulcanization, but comprising a center opening for connecting it to a piston rod.

Accordingly, while at least one embodiment of the present invention has been shown and described, it is to be understood that many changes and modifications may be made thereunto without departing from the spirit and scope of the invention as defined in the appended claims.

What is claimed is:

1. A composite diaphragm for diaphragm pumps comprising:
   a) an elastomer body shaped as a circular disk, the body comprising:
      i) a dish edge having a clamping area;
      ii) a bottom section;
      iii) a flexible diaphragm section connecting said dish edge with said bottom section;
      iv) a plurality of naps formed as cups with a circular or elliptic base area forming elevations on an elastomer backside of said elastomer body;
      vi) a connector device or a center opening for connecting a piston rod; and
   b) a polytetraflouroethylene (PTFE) coating disposed on a product side of said elastomer body, said coating being in a form of a plane ring surface in an area of said flexible diaphragm section.

2. The composite diaphragm as in claim 1, wherein said naps are lined up in at least two concentric circles.

3. The composite diaphragm as in claim 2, wherein said plurality of naps are arranged in concentric circles with an angular division of between 5° and 30°.

4. The composite diaphragm as in claim 3, wherein said plurality of naps are arranged in concentric circles in a plurality of radially extending lines extending through a center of said circular dish.

5. The composite diaphragm as in claim 3, wherein said plurality of naps are lined up in a radial manner in offset angles in relation to each other so that at least one nap of said plurality of naps is disposed adjacent to a gap between two naps lined up in an adjacent peripheral concentric circle.

6. The composite diaphragm as in claim 1, wherein said plurality of said naps are arranged to form a plurality of concentric circles comprising an inner concentric circle having a smallest diameter and additional concentric circles having larger diameters wherein said naps in said inner concentric circle are alined to form a chain without gaps.

7. The composite diaphragm as in claim 1, wherein said plurality of said naps are arranged to form a plurality of concentric circles comprising an outer concentric circle having a largest diameter and additional concentric circles having smaller diameters wherein said naps in said outer concentric circle are alined to form a chain without gaps.

8. The composite diaphragm as in claim 1, wherein said bottom section of said elastomer body comprises:
   a core formed by vulcanization; and
   wherein said connector device is disposed in said core.

9. The composite diaphragm as in claim 1, wherein said elastomer body contains a textile reinforcing insert.

10. The composite diaphragm as in claim 1, wherein said elastomer body has an elastomer backside and further comprises a plurality of ring shaped grooves on said elastomer backside in a transition area between said dish edge and said flexible section.

11. The composite diaphragm as in claim 1, wherein said elastomer body has an elastomer backside and further comprises a plurality of ring shaped grooves on said elastomer backside in a transition area between said flexible section and said bottom section.

12. The composite diaphragm as in claim 1, wherein said elastomer body has an elastomer backside and further comprises a plurality of recesses on said elastomer backside in a transition area between said dish edge and said flexible section.

13. The composite diaphragm as in claim 1, wherein said elastomer body has an elastomer backside and further comprises a plurality of recesses on said elastomer backside in a transition area between said flexible section and said bottom section.

* * * * *